United States Patent [19]

Bruynseels

[11] 4,343,622

[45] Aug. 10, 1982

[54] METHOD OF MAKING GRANULES BUILT UP FROM A CORE AND AN ENVELOPE

[75] Inventor: Jean P. Bruynseels, Brussels, Belgium

[73] Assignee: Compagnie Neerlandaise de l'Azote, Brussels, Belgium

[21] Appl. No.: 261,453

[22] Filed: May 8, 1981

[30] Foreign Application Priority Data

May 12, 1980 [NL] Netherlands ............... 8002738

[51] Int. Cl.$^3$ .............................................. B01J 8/18
[52] U.S. Cl. ................................. 23/313 FB; 264/117
[58] Field of Search ............... 23/313 FB; 426/285, 426/453; 422/140; 260/704; 264/117; 564/63, 73

[56] References Cited

U.S. PATENT DOCUMENTS

| | | | |
|---|---|---|---|
| 2,586,818 | 2/1952 | Harms | 23/313 FB |
| 3,120,438 | 2/1964 | McIntire et al. | 426/285 |
| 3,231,413 | 1/1966 | Berquin | 23/313 FB |
| 3,449,238 | 6/1969 | Stockburger et al. | 23/313 FB |
| 3,856,441 | 12/1974 | Suzukama et al. | 264/117 |
| 4,141,316 | 2/1979 | Grun | 426/453 |

FOREIGN PATENT DOCUMENTS 2016901 9/1979 United Kingdom ............... 426/453

*Primary Examiner*—Hiram Bernstein
*Attorney, Agent, or Firm*—Scully, Scott, Murphy & Presser

[57] ABSTRACT

Manufacture of granules built up from a core and an envelope in a fluidized bed of nuclei. A stream of liquid containing the enveloping material is hydraulically sprayed within the bed from the bottom upwards by means of at least one hydraulic sprayer surrounded by a coaxial, annular, converging aperture through which auxiliary gas is discharged at such a vertical velocity that the conical stream of droplets is narrowed to a stream having an apex angle of less than 20°, and in such a quantity that a cavity of dilute fluidized phase is formed above each sprayer, which cavity is located entirely within the bed.

2 Claims, No Drawings

METHOD OF MAKING GRANULES BUILT UP FROM A CORE AND AN ENVELOPE

Since some years, fluidized beds of solid particles have been increasingly used for the granulation of solids, in which cores are provided with an envelope consisting of the same material as the cores, or for the coating of solids, in which cores are provided with a coating consisting of a different material from the cores. In both the granulation and coating of solid substances, the substance for the envelope is sprayed in the form of a liquid material containing such substance in the molten, dissolved and/or suspended condition onto fluidized nuclei. The liquid material thus deposited on the fluidized nuclei must then be converted into the solid state under the influence of the temperature prevailing in the bed by cooling and/or evaporation of liquid. By a repetition of this process of alternate moistening and solidification of the deposited material, an envelope is gradually grown, until it has reached the desired thickness and the resulting granule can be removed from the bed. During the process the temperature of the bed is maintained substantially constant by a suitable selection of the conditions, such as the temperature of the fluidization gas and/or of the sprayed liquid material, with either the required heat being added to the bed, or the superfluous heat being removed from the bed.

The granulation or coating of solids in a fluidized bed in which cores are provided with an envelope that becomes gradually thicker, is effected by moistening the nuclei with droplets. If the droplets have approximately the same size as the cores the structure of the granules becomes "onion-like", which is referred to as "skin formation". When the droplets are much smaller than the cores the term used is accretion of droplets on the cores.

In skin formation, the cores are successively provided with a number of concentric layers of enveloping material. Skin formation takes place when the liquid material is sprayed onto the fluidized nuclei in the form of droplets large enough to cover the surface of the nucleus with a layer of liquid material, which is subsequently solidified to form a "skin" around the core. Owing to the superimposition of a plurality of such skins, the granules ultimately produced exhibit internal stresses, resulting from their onion-like structure, which adversely affect their mechanical properties, such as their crushing strength and resistance to attrition. According as the layer of liquid material deposited on a nucleus is thicker, additional problems may occur as a result of the circumstance that the material deposited cannot be dried completely before a fresh layer of liquid material is deposited on the nucleus.

In granulation or coating by accretion, the nuclei are successively moistened by droplets having such a small size that they can only cover a minor portion of the surface of a nucleus with a thin layer of liquid material. In this manner the envelope is gradually built up over small surfaces, by virtue of which the granules formed have a very fine structure and a very great strength. Indeed, the mechanical properties of granules produced by accretion are much better than those of granules made by skin formation.

A different method often used for the granulation of solids is the agglomeration of solid particles by means of a liquid material which causes a number of particles to stick together. By the crystallization and/or evaporation of the liquid, a coherent whole is then formed, which, however, has a non-homogeneous structure, and is of considerably inferior quality to granules produced by skin formation or accretion.

For these reasons the occurrence of agglomeration in the granulation or coating of solids in a fluidized bed should be avoided or kept to a minimum.

For the production of a given quantity of granules by granulation or coating in a fluidized bed, a given quantity of liquid material must be sprayed into the bed per unit of time. When the granulation is carried out on an industrial scale this is a considerable quantity which for example in a urea granulator having an average daily production of, for example, 800 tonnes is as high as 36,000 kg/hour. The spraying of such a large quantity of liquid material into a fluidized bed poses problems of a dual nature: In the first place the amount of energy required for the spraying must be as low as possible, or the cost price of the product becomes too high, and in the second place the fluidization in the bed must not be disturbed, and agglomeration of bed particles must be prevented or minimized, as otherwise no product of satisfactory quality is produced.

It is an object of the present invention to provide a solution for these problems.

The invention relates to a method of making granules built up from a core and an envelope, which method is characterized in that in a bed of solid particles, which by means of a fluidization gas stream distributed through a perforated, flat, horizontal or slightly slanting bottom plate is kept in the fluidized state, a liquid material containing the substance for the envelope in the molten, dissolved and/or suspended condition is sprayed onto the fluidized nuclei with the fluidized bed from the bottom in the upward direction in the form of droplets having such a small diameter that a droplet can only cover a portion of the surface of a nucleus, by means of at least one vertically disposed hydraulic sprayer, through which the liquid material is sprayed under hydraulic pressure in the desired drop size, and which sprayer is surrounded by a coaxial, annular, converging auxiliary-gas aperture, through which auxiliary gas is passed at such a vertical exit velocity that the conical stream of droplets issuing from the sprayer is narrowed by said auxiliary gas stream to a stream having an apex angle of less than 20°, and in such a quantity that a cavity of dilute fluidized phase, located entirely within the fluidized bed, is formed by said auxiliary gas stream above each sprayer, and the liquid material thus deposited on the nuclei is solidified by cooling and/or evaporation of liquid to form granules having a desired size.

By "nuclei" is understood not only the particulate material used, which is added to the bed as starting material, either continuously or batchwise, but also the granules being built in the bed.

The method according to the invention can be used for the granulation of all sorts of materials which can be sprayed in the molten state or as a solution or suspension, and can be solidified by crystallization and/or evaporation of liquid. Examples are sulphur, urea, ammonium salts, mixtures of ammonium salts with organic or inorganic additives, and the like. Also, granules of a given material, for example urea granules, can be coated with a different material, such as sulphur, by the method according to the invention.

The granulator to be used comprises a vessel having substantially vertical walls and a round, square or rectangular horizontal cross-sectional configuration, although other configurations are possible. The bed of nuclei is carried by a flat, perforated bottom plate, through which the fluidization gas, commonly air, is distributed and passed into the bed. The bottom plate may be disposed in a horizontal or slightly slanting position. A slight slant of, for example, 30' to 2° may be useful for promoting the removal of granules to a discharge opening located at the lower end of the bottom.

The volume of the fluidized bed is dependent on the desired capacity of the granulator and on the contemplated residence time of the granules in the bed. As regards the dimensions of the bed, there is a relationship between the quantity of fluidization gas to be supplied to the bed and the surface of the bed. Generally speaking, according as the amount of fluidization gas is larger, the bed surface area must be larger. As reaching thermal equilibrium in the bed during granulation requires supplying heat to the bed for evaporating liquid or removing heat of crystallization from the bed, means must be provided for supplying or removing heat. In the method according to the invention, heat is preferably supplied or removed by controlling the temperature of the fluidization gas. As this gas can undergo a limited change in temperature in the bed only, it will generally be necessary to supply a large quantity of fluidization gas to the bed in order to reach thermal equilibrium in the bed, which for the dimensions of the bed implies that the bed surface area must be adapted to this large quantity of gas, so that with a given bed volume only a limited height remains for the fluidized bed. Preferably, therefore, the method according to the invention is performed in a bed which in the fluidized state has a height $h$ and a surface area $S$ such that $h$ does not exceed $\sqrt{S}$. The limited bed height is advantageous from the point of view of cost of energy, as this cost increases according as the bed must be fluidized to a greater height.

When the method according to the invention is carried out on an industrial scale, the bed height $h$ generally ranges between 30 and 150 cm, and $\sqrt{S}$ is often a multiple of $h$. The bed may have any desired surface area.

In some fluidized-bed granulators, the liquid material is sprayed above the bed vertically downwardly. For a granulator having a large capacity, this has proved unsuitable because a large amount of dust is formed over the bed, which is entrained by the fluidization gas and causes pollution elsewhere, and because crust-like lumps are formed on the bed surface. Attempts at spraying the liquid material into the bed horizontally sideways or vertically downwards failed on account of substantial agglomeration in the bed.

We therefore chose vertically upward injection from the bottom of the fluidized bed. In this position a large number of hydraulic and pneumatic sprayers of various types were tested in a fluidized-bed granulator. Many of these tests failed owing to the occurrence of considerable agglomeration and lumping. Good results without agglomeration phenomena, however, were obtained with a pneumatic sprayer taken from an oil burner, and in which liquid is sprayed by means of compressed air flowing from an annular aperture provided around the liquid orifice. This sprayer gave a conical spray having a very small apex angle, namely, approximately 20°.

Using this sprayer, a number of granulation tests were run. These showed that proper operation of the granulator required that, according as the amount of liquid material to be sprayed was increased, so the amount of air was increased, in other words, the air pressure was increased. The possibility to do this, however, turned out to be limited because when a certain threshold value is exceeded, the air is blown right through the bed surface, to form a fountain of nuclei and grains above the bed, and large amounts of dust are entrained by the air stream issuing from the granulator.

An investigation into the cause of the phenomenon that the tested pneumatic sprayer from an oil burner did result in satisfactory granulation, and for example a hydraulic sprayer did not, although in both cases droplets of the same small size were formed, showed that in the tested pneumatic sprayer the compressed air performs two different functions. As a matter of fact, the compressed air not only atomizes the liquid material, but also forms a cavity of dilute fluidized phase in the fluidized bed above the sprayer. Thanks to the small apex angle of the conical spray from the tested pneumatic sprayer, the sprayed liquid material is sprayed virtually entirely into the cavity of dilute fluidized phase, where a large number of nuclei can be sprayed without the particles being able to approach one another sufficiently closely to agglomerate. This mechanism makes it possible to have a large number of sprayers of the type referred to in operation in a fluidized bed in closely spaced interrelationship without their affecting the efficacy of one another, and without the fluidization of the bed being disturbed.

Nevertheless, sprayers of this type turned out to be unsuitable for use on an industrial scale, as the spraying of a sufficient quantity of liquid material requires compressed air of a pressure of at least 3 ats gauge pressure. In connection with the high energy consumption, such a pressure is unacceptably high. When a hydraulic sprayer is used, the energy consumption is relatively low, it is true, but owing to the occurrence of excessive agglomeration, no satisfactory granulation is accomplished in the fluidized bed.

We have now found, however, that when a hydraulic sprayer is used excellent granulation can be obtained without the occurrence of appreciable agglomeration, if in that case, too, a cavity of dilute fluidized phase is formed above the sprayer within the fluidized bed, and at the same time it is ensured that the liquid material is sprayed within this cavity. According to the invention, this is achieved by spraying the liquid material under hydraulic pressure in the desired droplet size, and at the same time supplying around the stream of droplets, which with hydraulic sprayers has the form of a cone having an apex angle of generally 45° and 90°, an auxiliary gas stream which has two functions, namely (1) to form in the fluidized bed above the sprayer a cavity of dilute, fluidized phase, and (2) to narrow the conical stream of droplets issuing from the sprayer in such a manner that the stream of droplets is sprayed virtually entirely into the cavity of dilute fluidized phase.

According to the invention, the auxiliary gas is supplied through an annular converging orifice provided coaxially around the spraying orifice. The amount of auxiliary gas passed through the annular orifice per unit of time should be sufficient to form a cavity of dilute fluidized phase above the sprayer. The quantity of auxiliary gas is preferably sufficient to form as large a cavity within the fluidized bed as possible without the auxiliary gas being blown through the top surface of the bed. Furthermore, the velocity at which the auxiliary gas leaves the annular orifice should be sufficient to narrow the conical stream of droplets issuing from the hydraulic sprayer to a stream having an apex angle of less than 20°. The gas velocity required for this depends on the drop size of the sprayed material, the original apex angle of the stream of droplets, the exit velocity of the stream of droplets, and the desired apex angle of the narrowed stream of droplets, and generally ranges between 60 and 300 m/sec., mostly between 150 and 280 m/sec.

The amount of auxiliary gas per unit of time, required to form as large a cavity as possible can be readily determined experimentally, and so can the velocity of the auxiliary gas, required for the desired narrowing of the conical stream of droplets. From these two data, the required surface area of the annular orifice can be calculated.

The stream of liquid, i.e. the amount of liquid material sprayed by a sprayer per unit of time, is preferably equal to the maximum current that can be taken up by the cavity of dilute fluidized phase formed above the sprayer without agglomeration effects being observed.

Hydraulic sprayers are commercially available for a broad range of drop sizes, namely from 10 micron to 500 micron and more. Accordingly, for each product to be granulated or coated it is possible to select a sprayer providing a drop size suitable for accretion.

When the method according to the invention is used on an industrial scale, many, sometimes several hundreds of sprayers must be placed in the granulator to achieve the desired capacity. This is possible without any problems.

As the auxiliary gas, air is commonly used. If, however, in the granulation or coating method according to the invention substances are used which are sensitive to oxygen, an inert gas may serve as the fluidization gas and as the auxiliary gas instead of air. The air or the inert gas may be preheated, should this be desired, for example, to prevent solidification or crystallization within the sprayer when a highly-concentrated melt or solution is sprayed.

The size of the product granules depends on a number of factors, such as the number of nuclei in the fluidized bed, the size of these nuclei, the quantity of liquid material sprayed per unit of time, and the residence time of the nuclei in the bed. Thus, for example, larger product granules will be produced according as the number of nuclei in the fluidized bed is smaller and the residence time longer. For maintaining a particular grain size distribution of the product, it is preferable that the bed contents should be kept as constant as possible, both as regards grain size distribution and number of nuclei. This can be achieved by keeping the quantity by weight of the nuclei to be added to the fluidized bed, with the proper grain size distribution, in line with the quantity by weight of the product granules removed from the bed. Generally speaking, the nuclei to be added to the bed have a size of between 0.2 and 4 mm, although in particular cases larger cores may be used. The product granules discharged from the granulator may, if desired, be separated into an undersize fraction, a product size fraction, and an oversize fraction. The fraction last mentioned can be crushed to the same or smaller sizes than those of the undersize fraction, and subsequently recycled to the granulator along with the undersize fraction.

EXAMPLE

In a granulator provided with a flat perforated bottom plate and containing a fluidized bed of urea nuclei, a urea solution is processed into granules having an average diameter of 2.9 mm. Daily production is 800 tonnes.

The bed has a surface area of 9.6 $m^2$ and weighs 5000 kg. It is fluidized up to a height of 1000 mm by means of air which at a temperature of 30° C. is supplied through the perforated bottom plate at a rate of 52,000 $Nm^3$/hour.

By means of 110 hydraulic sprayers mounted in the bottom of the granulator, 35.8 tonnes of aqueous urea solution, having a urea concentration of 95% by weight, are sprayed vertically upwardly into the bed per hour. Each hydraulic sprayer is surrounded by a coaxial, annular converging slot having an outer diameter of 17 mm and an inner diameter of 5.8 mm. The sprayers spray the urea solution under a hydraulic pressure of 8 $kg/cm^2$ in the form of droplets having an average diameter of 110 micron. In the absence of air supply through the annular slot, the conical stream of droplets has an apex angle of 45°.

It has been determined by means of experiments that the formation of a cavity of dilute fluidized phase extending above each sprayer until just below the upper surface of the fluidized bed requires a quantity of air of 130 $Nm^3$/hour per sprayer, and furthermore that the narrowing of the stream of droplets to a conical stream having an apex angle of approximately 10° requires the air to leave the annular slot at a velocity of approximately 275 m/sec. From this it can be calculated that the annular slot must have a passage area of 2 $cm^2$.

Per sprayer and per hour, 325 kg urea solution of a temperature of 135° C. is sprayed, and 140 $Nm^3$ air of a temperature of 145° C. is passed through the annular slot at an absolute pressure of 1.4 ats. The compression power required for this is approximately 300 kW. Under these conditions, a temperature of 100° C. is maintained in the bed.

The granulation proceeds excellently without appreciable agglomeration effects.

From the granules discharged from the bed, the fraction having a diameter of between 2.0 and 3.5 mm is won as a product. The rest is crushed to a particle size of approximately 1.1–1.4 mm and recycled to the granulator at a rate of 2.5 tonnes/hour.

The performance of the granulation process described under the same conditions, but using pneumatic sprayers requires a total number of 220 sprayers, to which a total amount of 21,000 $Nm^3$ air must be supplied per hour under an absolute pressure of 4 ats. In that case the granulation also proceeds excellently, but the required compression power is then 1.4 Mw, i.e. almost the 5-fold of the power required in carrying out the granulation according to the invention.

What I claim is:

1. A method of making granules built up from a core and an envelope, which method is characterized in that in a bed of solid particles, which by means of a fluidization-gas stream distributed through a perforated, flat, horizontal or slightly slanting bottom plate is kept in the fluidized state, a liquid material containing the substance for the envelope in the molten, dissolved and/or suspended condition is sprayed onto the fluidized nuclei within the fluidized bed from the bottom in the upward direction in the form of droplets having such a small diameter that a droplet can only cover a portion of the surface of a nucleus, by means of at least one vertically disposed hydraulic sprayer, through which the liquid material is sprayed under hydraulic pressure in the desired drop size, and which sprayer is surrounded by a coaxial, annular, converging auxiliary-gas aperture, through which auxiliary gas is passed at such a vertical exit velocity that the conical stream of droplets issuing from the sprayer is narrowed by said auxiliary gas stream to a stream having an apex angle of less than 20°, and in such a quantity that a cavity of dilute fluidized phase, located entirely within the fluidized bed, is formed by said auxiliary gas stream above each sprayer, and the liquid material thus deposited on the nuclei is solidified by cooling and/or evaporation of liquid to form granules having a desired size.

2. A method as claimed in claim 1, characterized in that, in the fluidized state, the bed has a height $h$ and a surface area $S$, such that $h$ does not exceed $\sqrt{S}$.

* * * * *